United States Patent
Hodgkinson et al.

(10) Patent No.: US 6,178,169 B1
(45) Date of Patent: Jan. 23, 2001

(54) METHOD OF TRANSMITTING AN ATM CELL OVER AN ATM NETWORK

(75) Inventors: Terence G. Hodgkinson, Woodbridge; Alan W. O'Neill, Ipswich, both of (GB)

(73) Assignee: British Telecommunications public limited company, London (GB)

( * ) Notice: Under 35 U.S.C. 154(b), the term of this patent shall be extended for 0 days.

(21) Appl. No.: 08/826,788

(22) Filed: Apr. 4, 1997

Related U.S. Application Data

(63) Continuation-in-part of application No. 08/659,499, filed on Jun. 6, 1996, now abandoned.

(30) Foreign Application Priority Data

Mar. 28, 1996 (EP) .................................................. 96302140

(51) Int. Cl.⁷ .......................... H04L 12/28; H04L 12/50; H04L 12/56
(52) U.S. Cl. .......................... 370/395; 370/351; 370/357; 370/391; 370/399
(58) Field of Search .................................... 370/351, 352, 370/353, 354, 355, 356, 389, 392, 395, 396, 397, 398, 399, 60, 68, 256, 257, 230, 252

(56) References Cited

U.S. PATENT DOCUMENTS

| | | |
|---|---|---|
| 5,168,492 | 12/1992 | Beshai et al. . |
| 5,280,476 | 1/1994 | Kojima et al. . |
| 5,287,535 | 2/1994 | Sakagawa et al. . |
| 5,339,317 | 8/1994 | Tanaka et al. . |
| 5,361,255 | 11/1994 | Diaz et al. . |
| 5,432,777 * | 7/1995 | Le Boudec et al. ............... 370/60 |
| 5,440,547 * | 8/1995 | Easki et al. ........................ 370/60 |
| 5,450,406 | 9/1995 | Esaki et al. . |
| 5,455,841 | 10/1995 | Hazu . |
| 5,548,589 * | 8/1996 | Jeon et al. ........................ 370/60.1 |
| 5,872,773 * | 2/1999 | Katzela et al. ................... 370/256 |
| 5,903,559 * | 5/1999 | Acharya et al. .................. 370/55 |

FOREIGN PATENT DOCUMENTS

| | | |
|---|---|---|
| 0552385 A1 | 7/1993 | (EP) . |
| 0570630 A1 | 11/1993 | (EP) . |

* cited by examiner

Primary Examiner—Huy D. Vu
Assistant Examiner—M. Phan
(74) Attorney, Agent, or Firm—Nixon & Vandehrye P.C.

(57) ABSTRACT

An ATM network includes a set of interconnected switches and gateways. The ATM network is capable of providing both a conventional connection-oriented service or a connectionless service. Where a connectionless service is required, at the input interface, source and destination addresses are inserted into the header and fields in the header are set to values which indicate that a connectionless service is required and whether or not additional processing is also required. At each node between the input interface and the output interface, where a connectionless service is required, each ATM cell is routed in accordance with its source address and destination address and/or a routing table which is set up by routing protocol or network management.

5 Claims, 7 Drawing Sheets

METHOD OF TRANSMITTING AN ATM CELL OVER AN ATM NETWORK

RELATED APPLICATION

This application is a continuation-in-part of U.S. application Ser. No. 08/659,499 filed Jun. 6, 1996, now abandoned.

BACKGROUND OF THE INVENTION

1. Field of the Invention

This invention relates to a method of transmitting an asynchronous transfer mode (ATM) cell over an ATM network between an ATM input interface and an ATM output interface.

2. Related Art

In a conventional ATM network, when a cell arrives at the ATM input interface, initial values are inserted into the virtual path identifier (VPI) and virtual channel identifier (VCI) fields in the header. The VPI field provides the coarse level routing for the ATM cell and the VCI field provides the fine level routing. At each switching node between the ATM input interface and the ATM output interface, the VPI and/or VCI fields are read and the output port is selected in accordance with the value of one or both of these fields using the routing table contained in the node. Before forwarding the cell on the selected output port, the values of one or both of these fields are updated.

In each switching node, the routing table and the updating values for the VPI and/or VCI fields are set up partly by network management and partly by signalling during call set up. Consequently, a conventional ATM network provides a connection-oriented service. In a connection-oriented service, the call is set up by signalling at the commencement of the cell and cleared down at the end of the call. Alternatively, the routing table and the updating values may be set up to provide a permanent connection.

If it is desired to transmit data over a switched ATM network, for example data from a computer provided with an ATM card, it is necessary to set up a call before the data can be transmitted. If the data is then transmitted more or less continuously for the duration of the call, the connection-oriented service provided by a conventional ATM network is satisfactory. However, it is often desired to transmit data intermittently, one burst of cells at a time followed by a long pause before the next burst of cells is transmitted. However, this incurs an overhead cost of setting up and clearing down the call for each burst of cells. Thus, a conventional switched ATM network is not optimal for intermittent transmission of data.

In order to provide a connectionless service over an ATM network, it has been proposed to add a server to provide a connectionless service as an overlay to an ATM network. However, this solution suffers from the disadvantage that there is still a call set up phase, in this case between the input interface and the server.

SUMMARY OF THE INVENTION

According to one aspect of this invention there is provided a method of transmitting an asynchronous transfer mode (ATM) call from a source node to a destination node over an ATM network between an ATM input interface and an ATM output interface in a connectionless manner, said source node and destination node each having a network address, said ATM cell comprising a header and a user section, said network comprising a network of interconnected nodes at least some of which are switching nodes, said method comprising the steps of:

at the ATM input interface, setting a field in the header of the ATM cell to a value which indicates connectionless transmission and inserting a source address and a destination address into the header, the source address being the network address of the source node and the destination address being the network address of the destination node; and at each switching node between the ATM input interface and the ATM output interface, establishing that the cell is to be forwarded in a connectionless manner by reading said field in the header, reading the destination address in the header, selecting an output port in accordance with at least the destination address, and forwarding the cell on the selected output port.

The present invention provides the advantage that the routing tables do not need to be set up by signalling for each transmission of ATM cells between a particular access node and a particular destination node. Consequently, where cells are transmitted in bursts, there is no overhead cost of setting up a call for each burst of cells.

According to another aspect of this invention, there is provided a method of operating an ATM network so as to transmit cells between a source node and a destination node over the network selectively in either a connectionless manner or a connection-oriented manner, said source node and destination node each having a network address, each ATM cell comprising a header and a user section, said network comprising a network of interconnected nodes at least some of which are switching nodes;

in the event of transmitting an ATM cell over the network in a connectionless manner between an ATM input interface and an ATM output interface, said method comprising the steps of:

at the ATM input interface, setting a field in the header of the ATM cell to a value which indicates connectionless transmission and inserting a destination address and a source address into the header, the source address being the network address of the source node and the destination address being the network address of the destination node; and at each switching node between the ATM input interface and the ATM output interface, establishing the cell is to be forwarded in a connectionless manner by reading said field in the header, reading the destination address in the header, selecting an output port in accordance with at least the destination address and forwarding the cell on the selected output port;

in the event of transmitting an ATM cell over the network in a connection-oriented manner between an ATM input interface and an ATM output interface, said method comprising the steps of:

at the ATM input interface setting the virtual path identifier (VPI) and the virtual channel identifier (VCI) fields in the header; and at each switching node between the ATM input interface and the ATM output interface, reading the VPI and/or VCI fields in the header, selecting an output port in accordance with the VPI and/or VCI values, updating the VPI and/or VCI fields, and forwarding the cell on the selected output port.

According to a further aspect of this invention there is provided a method of transmitting an asynchronous transfer mode (ATM) cell from a source node to a least one destination node so as to provide a multicast service over an ATM network between an ATM input interface and an ATM output interface in a connectionless manner, said network comprising a network of interconnected nodes at least some of which are switching nodes, said method comprising the steps of:

at the ATM input interface, setting a field in the header to a value which indicates connectionless transmission and inserting a source address and a destination address into the header, the source address being the network address of the source node and the destination address being the network address of the multicast service; and at each switching node between the ATM input interface and the ATM output interface, establishing that the cell is to be forwarded in a connectionless manner by reading said field in the header, reading the destination address in the header, selecting at least one output port in accordance with at least the destination address, and then forwarding the cell on said at least one selected output port.

BRIEF DESCRIPTION OF THE DRAWINGS

This invention will now be described in more detail, by way of example, with reference to the drawings in which.

DETAILED DESCRIPTION OF EXEMPLARY EMBODIMENTS

Figure 1:
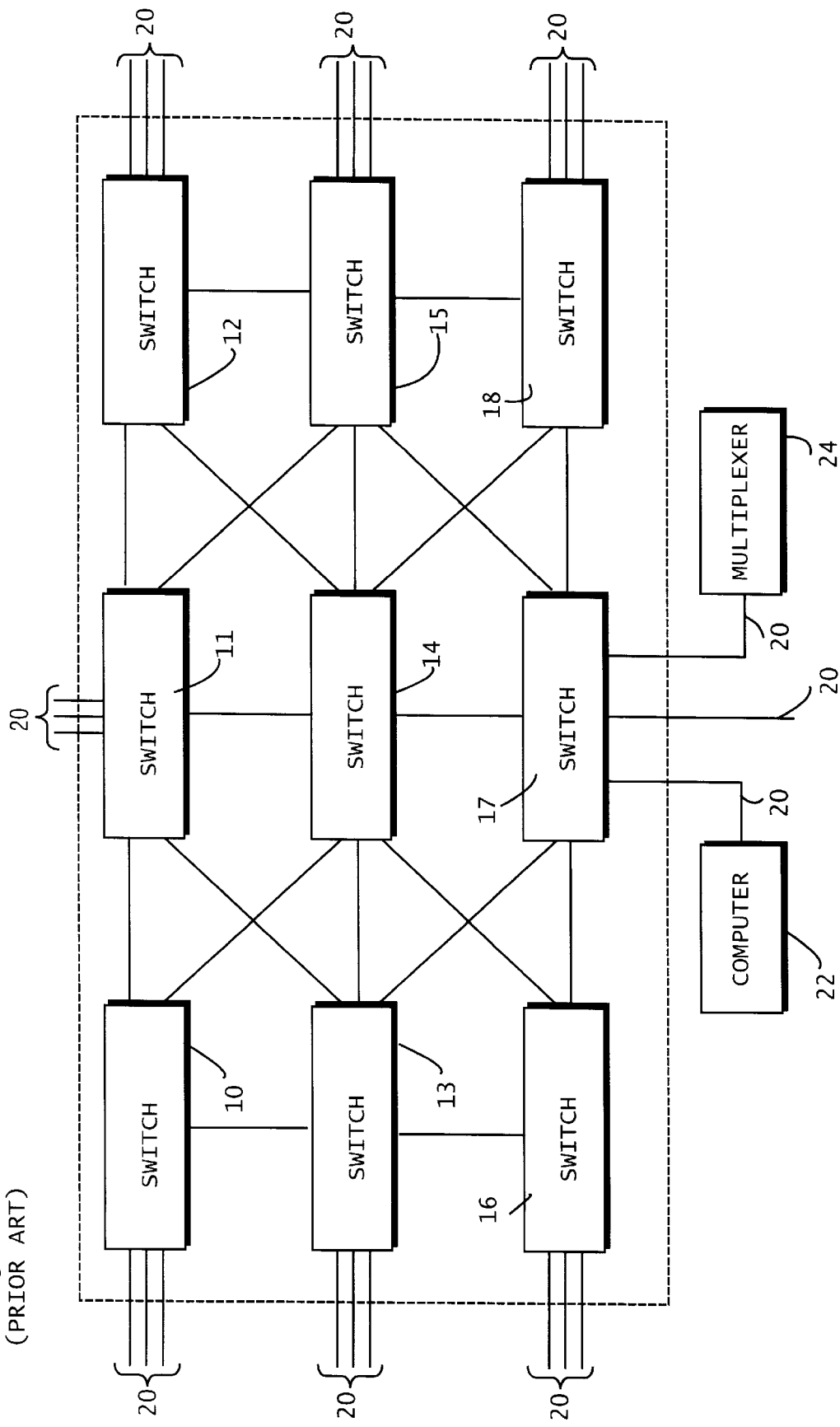
FIG. 1 is a block diagram of a conventional asynchronous transfer mode (ATM) network.

Referring now to FIG. 1, there is shown a block diagram of a conventional ATM network. The ATM network comprises a network of partially interconnected switching nodes in the form of ATM switches 10 to 18. In the network of FIG. 1, switches 10, 11, 12, 13, 15, 16, 17 and 18 also function as access switches. Each of the access switches is connected to a set of access lines 20 which connect the switch to other networks or directly to customer equipment. By way of illustration, FIG. 1 shows switch 17 connected by one access line 20 to a computer 22 and by another access line 20 to a multiplexer 24. The computer 22 is provided with an ATM card which enables it to transmit and receive data in the form of ATM cells. The multiplexer 24 can receive video, data and speech signals and convert these in a multiplexed manner into ATM cells. Likewise, it can receive ATM cells from the switch 17 and convert these to video, data and voice signals. Typically, the multiplexer 24 will be located at the premises of a user of the ATM network.

As is known to those skilled in the art, when transmitting an ATM cell between the ATM input interface and the ATM output interface, initial values are inserted into the virtual path identifier (VPI) and virtual channel identifier (VCI) fields in the header. The ATM input or output interface may be in an access node or outside the ATM network, for example in computer 22 or multiplexer 24. Then, at each switching node, the values of the VPI and/or VCI fields are read and one or both of the values are used together with a routing table to select an output port. Before the ATM cell leaves the switch, the values of one or both of the VPI and VCI fields are updated in accordance with data contained in a routing table. The VPI field provides a coarse level of routing whereas the VCI field provides a fine level of routing. The routing tables are set up partly by network management and partly during call set up. Mainly, but not entirely, virtual path routing tables are set up by network management and virtual channel routing tables are set up by signalling during call set up.

The structure of a basic ATM cell and the header fields will now be described.

Figure 2:
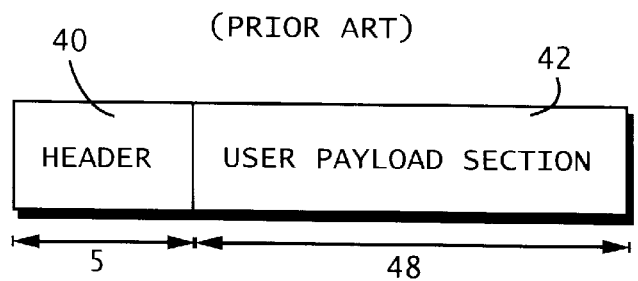
FIG. 2 shows the structure of a basic ATM cell.

Referring now to FIG. 2, a basic ATM cell comprises a five-octet header 40 and a 48-octet user payload section 42. The cell header 40 is used to route the call between switches across the network and the user payload section 42 contains the user's data and it is carried transparently across the network and delivered unchanged at the far end.

Figure 3:
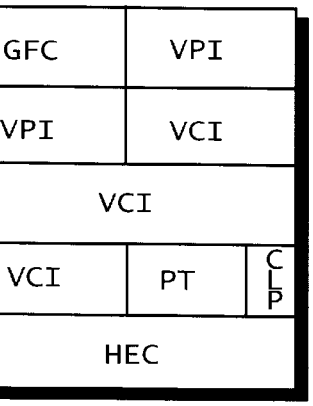
FIG. 3 shows the header fields used in a basic ATM cell during transmission between a user and an ATM network interface.
Figure 4:
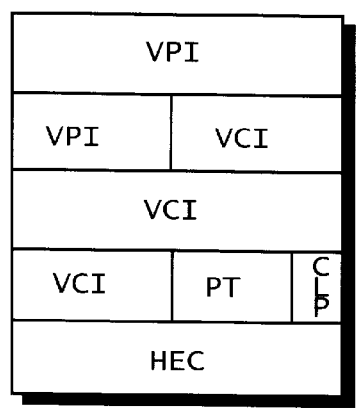
FIG. 4 shows the fields used in the header of a basic ATM cell during transmission between nodes within an ATM network.

Referring now to FIGS. 3 and 4, there are shown the fields in the header of a basic conventional ATM cell. FIG. 3 shows the fields which are used in transmitting an ATM cell across a user-network interface and FIG. 4 shows the fields which are used in transmitting the cell across a network node interface within an ATM network. With one exception which will be described below, the fields are the same in both cases. The key for the fields is set out in Table 1 below.

TABLE 1

| | |
|---|---|
| GFC | generic flow control |
| VPI | virtual path identifier |
| VCI | virtual channel identifier |
| PT | payload type |
| CLP | cell loss priority |
| HEC | head error correction |

The generic flow control (GFC) field is present only at the user network interface. This field is intended to arbitrate usage between multiple terminals sharing the same access switch. This field is four bits long.

The virtual path identifier (VPI) field provides the coarse level routing for ATM cells. The VPI value changes each time the cell is switched at a switch which provides virtual path switching. At the user network interface, the VPI field has only eight bits. This increases to 12 bits between nodes of the network as there is no need for generic flow control bits as a cell is transmitted through a network.

The virtual channel identifier (VCI) field provides fine level routing for ATM cells. The VCI value in the header changes each time a cell is switched by a switch which provides virtual channel routing. The VCI field is 16 bits long.

The payload type (P) field is used to indicate the general type of data in the cell. Typical uses of this field are to identify operation, administration and maintenance cells, congestion conditions and resource management or the last cell of a multi-cell message. This field is three bits long.

There is always a light risk of cells being lost in an ATM network. The cell loss priority (CLP) field is one bit long.

When this bit is set, it tells the network that this cell is less important and should be discarded in favour of another cell when a loss must take place.

The head error check (HEC) field provide a check sum over the cell header. It can detect bit errors in the cell header and can sometimes be used to correct them. This field is eight bits long.

A conventional switched ATM network, such as the network shown in FIG. 1, is unsuitable for transmitting data which is transmitted intermittently or in bursts. If a conventional switched ATM network is used to transmit this type of data, the routing tables are set up during call set up before it is required to transmit data and the connection is maintained for as long as data transmission is required. This suffers from the disadvantage that the connection is maintained during pauses between data transmission and this can be wasteful. The type of service provided by a conventional ATM network is a connection-oriented service and this type of service is generally unsuited to transmitting data in bursts. Transmission of data in bursts is generally more suited to what is known as a connectionless service. In a connectionless service, there is no call set up procedure and routing tables are set up by routing protocol or network management processes and not during call set up.

In several protocols which provide a connectionless service, for example the Internet protocol (IP), the header includes a field for indicating the type of service required. It is envisaged that each possible type of service may have a corresponding value in this field. Examples of type of service are low delay, a request for a switch to reserve buffer space for a return call, and multi-casting in which a call is routed to more than one destination. There is no corresponding field in the header of an ATM cell. Type of service is established during call set up or by network management. Consequently, if an ATM network receives data via an appropriate gateway from another network in which the data is transmitted in accordance with a connectionless service, it is impossible to provide the type of service requested in the other network on a per cell basis.

Figure 5:
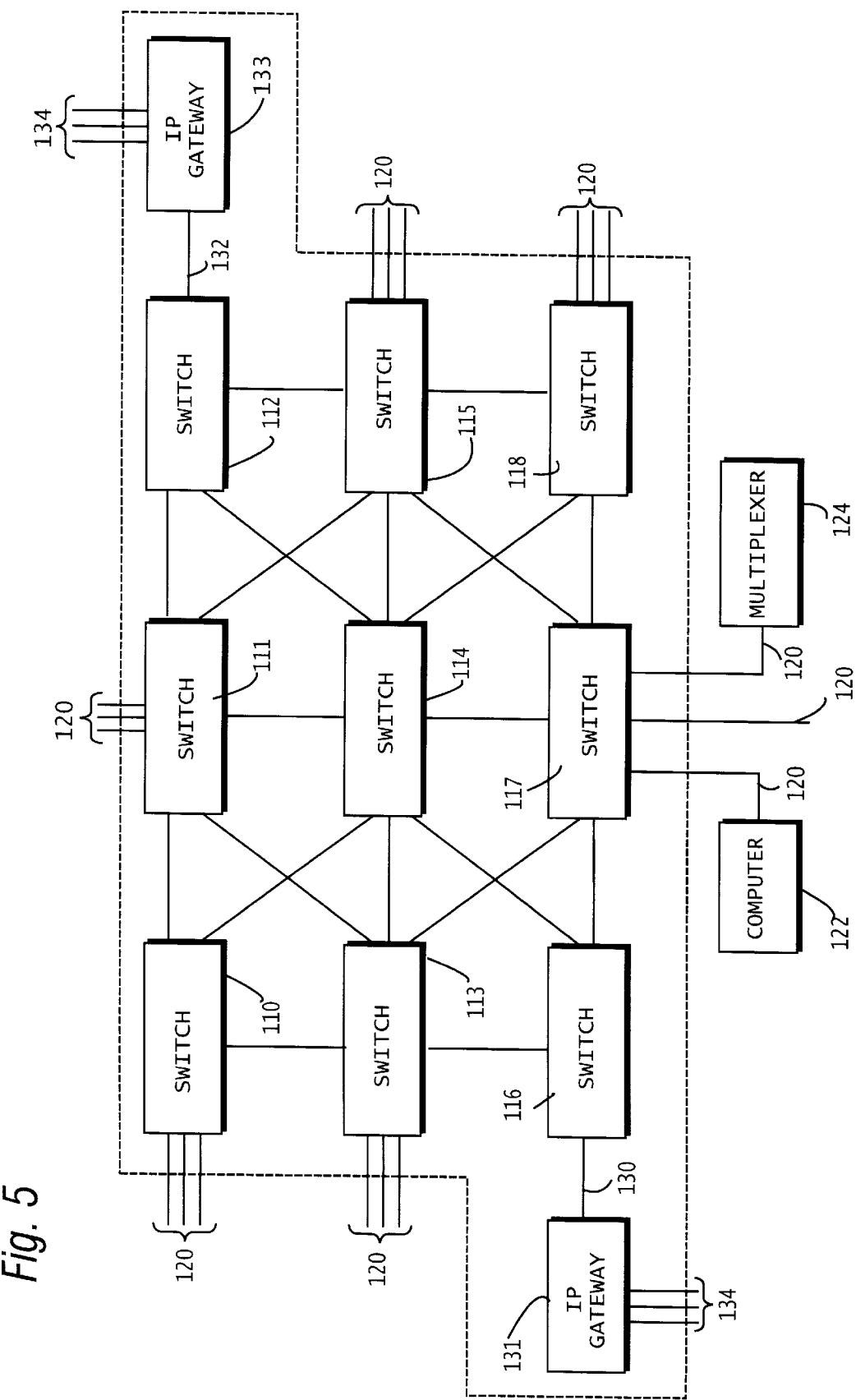
FIG. 5 is a block diagram of an ATM network embodying this invention.

Referring now to FIG. 5, there is shown an ATM network embodying this invention. As will become clear from the following description, the ATM network is capable of transmitting ATM cells in either a connection-oriented manner or a connectionless manner. It is also capable of providing various types of service such as the services mentioned above and also additional processing.

The general layout of the network of FIG. 5 is similar to that shown in FIG. 1. Thus, the network of FIG. 5 comprises a network of partially interconnected switching nodes in the form of ATM switches 110 to 118. The switches 110, 111, 113, 115, 117 and 118 are access switches which can receive data from other networks or directly from user equipment on input/output lines 120. By way of illustration, switch 117 is shown connected to a computer 122, generally similar to the computer 22 of FIG. 1, and also to a multiplexer 124, which is generally similar to the multiplexer 24 of FIG. 1.

The switch 116 is connected by an input/output line 130 to an IP gateway 131 and the switch 112 in connected by a line 132 to an IP gateway 133. Each of the IP gateways 131 and 133 can receive data from, and transmit data to, an IP network on input/output lines 134.

In operation, when one of the IP gateways 131 or 133 is acting as an input access node for data received from an IP network, it decomposes the IP packets into ATM cells. When one of these gateways is acting as an output access node, it re-assembles the ATM cells into IP packets.

When the network shown in FIG. 5 is used to transmit ATM cells between an ATM input interface and an ATM output interface in a connection-oriented manner, the ATM cells are transmitted through the network in the conventional manner described with reference to FIG. 1 and the fields of the header are as shown in FIG. 3. However, additional processing is now provided over conventional ATM to establish whether or not the transmission is being made in a connection-oriented manner. When the network shown in FIG. 5 is used to transmit ATM cells between an ATM input interface and an ATM output interface in a connectionless manner, both the mode of transmission and also the fields in the header differ from the mode of transmission and header fields used in a conventional ATM network. This difference will now be described.

Figure 9:
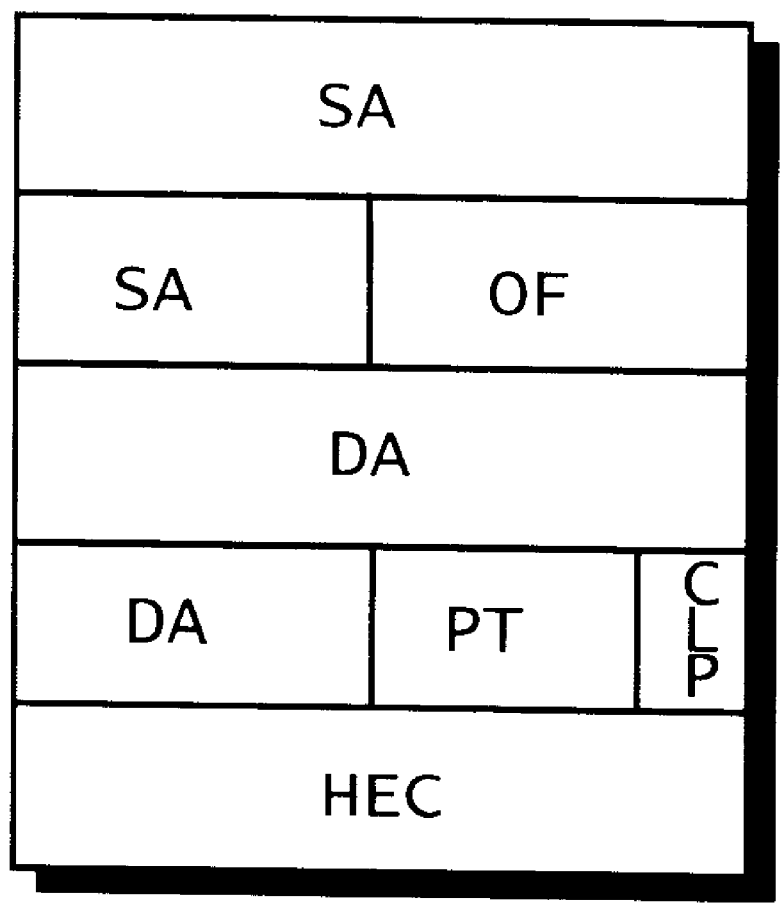
FIG. 9 shows the header fields which are used in an ATM cell in the network of FIG. 5 when it is providing a connectionless service.

Referring now to FIG. 9, there are shown the header fields which are used in an ATM cell in the network of FIG. 5 when it is providing a connectionless service. They key for these fields is set out in Table 2 below.

TABLE 2

| | |
|---|---|
| SA | source address |
| OF | option field |
| DA | destination address |
| PT | payload type |
| CLP | cell loss priority |
| HEC | head error check |

The source address (SA) field indicates the network address of the source node. The source node will normally be at the input interface to the ATM network shown in FIG. 5. For example, the source node could be switch 113 or the computer 122 or the multiplexer 124 or the IP gateway 131.

The option field (OF) may be set to a value which indicates that a particular service is required or that additional processing is required. Examples of services which may be supported are a request for a switch to reserve buffer space for a return call, a request for low delay or multicasting. Each possible type of service is assigned a unique value in the option field. A requirement to perform additional processing is also assigned a unique value in the option field. Examples of additional processing are an intelligent network operation, a network management operation or a routing operation.

When a cell which requires additional processing is received at a switch, the cell is passed to a higher layer in the switch and its payload section is examined to determine what additional processing is required. For example, if an intelligent network operation is required, the switch may access a remote database to determine a new destination address from the destination address in the cell. The destination address is then changed accordingly.

By way of another example, some of the bits of the payload section of a cell may specify that a network management operation is required. When such a cell is passed to a higher layer in a switch, the switch performs the required operation.

The destination address (DA) field is used to indicate the network address of the destination node. The destination address will normally be at the output interface. When providing a multicast service, the destination address is the network address for the multicasting service.

The source address, destination address and option field ordering and structure are network domain specific, where a domain is a collection of nodes sharing the same formats for these fields.

This invention is not restricted to ATM networks using the conventional cell header and payload structure and sizes shown in FIGS. 3 and 4. Where, as in the present example, these conventional cell header and payload structures are used, 28 bits in total are allocated to the SA, DA and OF fields. The reason for this is that this is the number of bits used by the conventional GFC, VPI and VCI fields. The bits then allocated to the SA, DA and OF fields can be arbitrarily chosen, but they must be specific within a specific domain.

In the present example, the SA and DA fields are each 12 bits long and the OF field is 4 bits long. Consequently, the network domain shown in FIG. 5 can support 4096 source addresses, 4096 destination addresses and 16 options.

Source and destination addresses outside the network may additionally be specified in the payload section of the first cell of each transmission.

The payload type (PT) field is identical to this field used in the header of a conventional ATM cell except that a predefined value, which in the present example is "111", is used to indicate that the service is connectionless.

The CLP and HEC fields are identical to these fields in the header of a conventional ATM cell.

Figure 6:
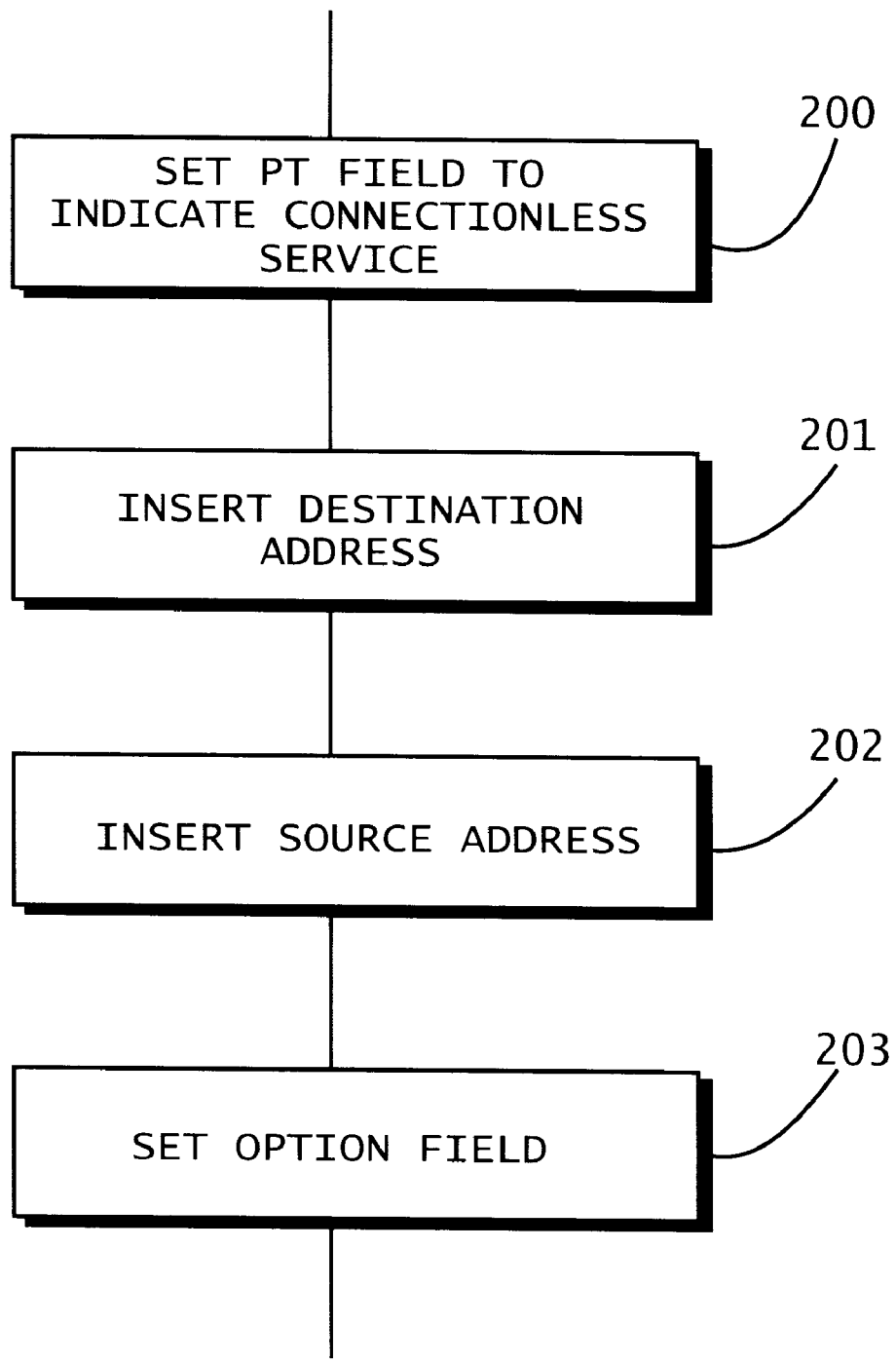
FIG. 6 is a flow chart of the operations performed on an ATM cell at the input interface to the network of FIG. 5.

When a user of the network shown in FIG. 5 wishes to transmit ATM cells over the network using a connectionless service, it indicates to one of the access switches, for example switch 117, that a connectionless service is required and it provides the destination address. If a particular service or additional processing is required, it also indicates this. The access switch then performs the operations shown in FIG. 6 on each ATM cell which it receives from the user. These operations will now be described. Alternatively, if the input interface is at a node outside the network, the operations are performed at that node.

In a step 200, the PT field is set to a value "111" to indicate a connectionless service. Then, in a step 201, the destination address is inserted and in a step 202 the source address is inserted. Finally, in a step 203, if a particular type of service or additional processing is required, the PT field is set to the appropriate value.

Figure 7:
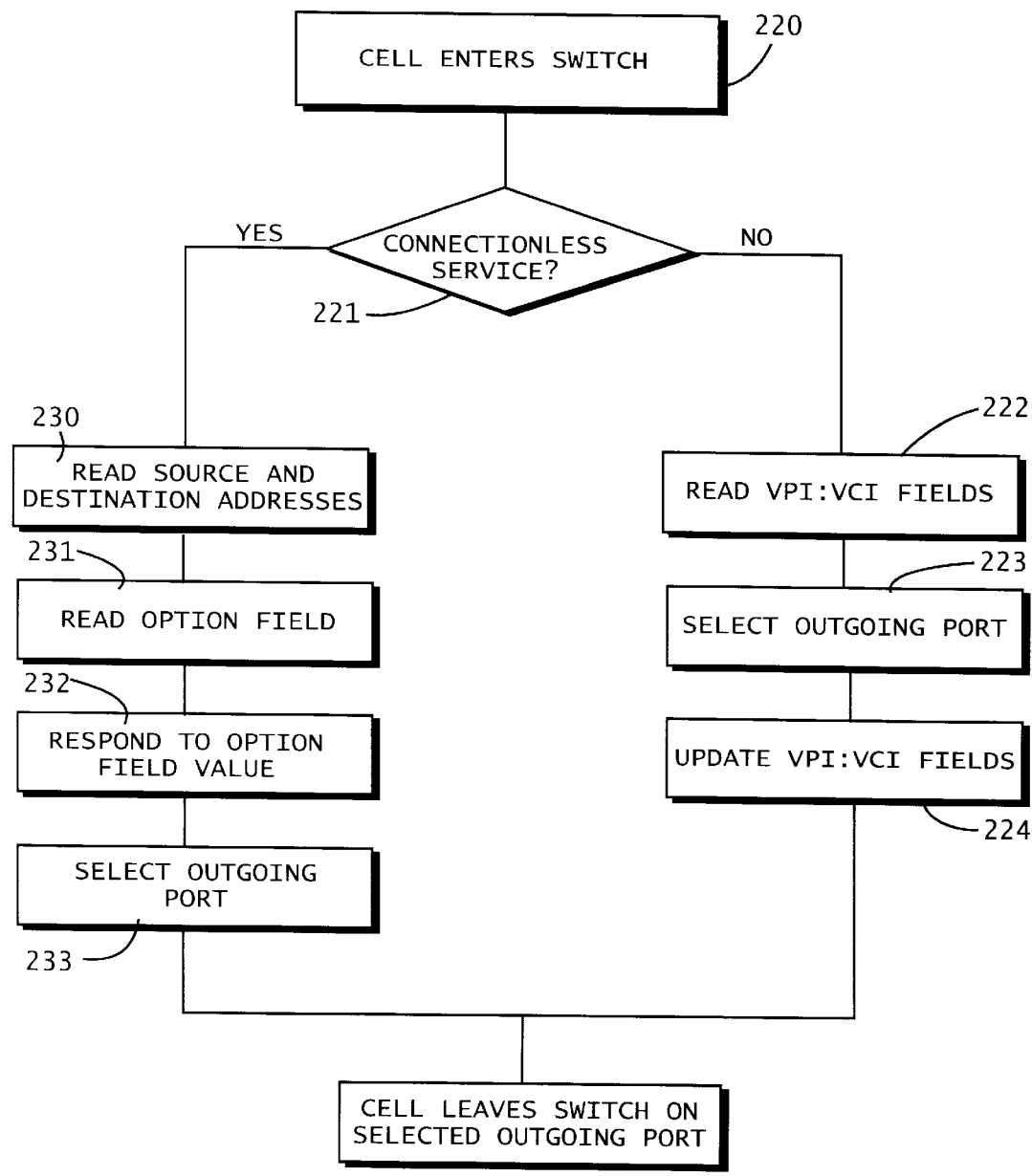
FIG. 7 is a flow chart showing the operations performed on an ATM cell in a switching node of the network of FIG. 5.

FIG. 7 shows the operations which are performed at each switch between the input interface and the output interface on each ATM cell. These operations will now be described.

In a step 220, the cell enters the switch. Then, in a step 221, the switch reads the PT field to determine whether a connectionless service is required. If a connectionless service is not required, it performs the operations which are performed by a conventional ATM switch. Thus, in a step 222, it reads the VPI and/or VCI fields. Some ATM switches are only virtual path switches, some are only virtual channels switches and some are both virtual path and virtual channel switches. Thus, the fields which are read and used will depend upon the type of switch. Next, in a step 223, the routing table together with the values of the VPI and/or VCI fields are used to select an output port. Next, in a step 224, the VPI and/or VCI fields are updated in accordance with the data in the routing table. Lastly, in a step 225, the cell leaves the switch on a selected output port.

If it is found in step 221 that a connectionless service is required, the following operations are performed.

In a step 230, it reads the source and destination addresses (SA and DA fields) in the header. In a step 231, it reads the OF field to determine the service type. In a step 232, it performs such operations as may be specified in the option field, for example reserving buffer space or performing additional processing.

Then, in a step 233, it selects the outgoing port by using the value of the destination addresses or the values of both the source and destination addresses and also the routing table. Therefore, the route which is followed by a connectionless ATM cell as it is transmitted over the network could depend upon the source address as well as the destination address.

Lastly, the cell leaves the switch in step 225.

Figure 8:
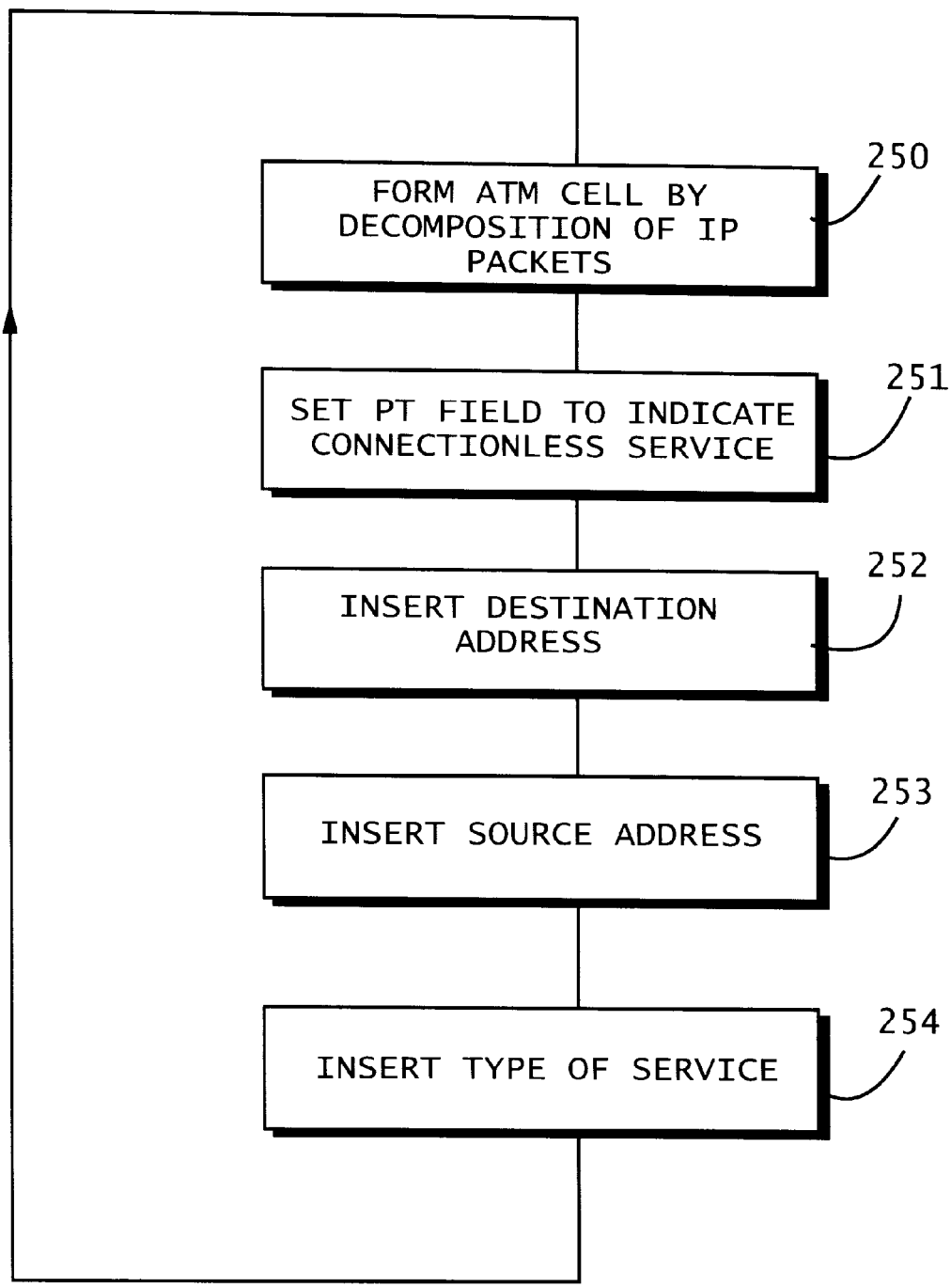
FIG. 8 is a flow chart of the series of operations which are used to form an ATM cell in an Internet Protocol (IP) gateway to the network of FIG. 5.

Referring now to FIG. 8, there is shown the series of operations which are performed on IP packets received at one of the IP gateways 131 and 133 to form each ATM cell.

Firstly, in a step 250, an ATM cell is formed by decomposition of IP packets. As a result of decomposing IP packets, the source and destination addresses, the required type of service and any request for additional processing are read.

Then, in a step 251, the PT field is set to indicate that a connectionless service is required. Next, in steps 252 and 253, the destination address and source address are inserted into the header. Lastly, in a step 254, if appropriate, the option field is set to indicate the required type of service or that additional processing is required.

The network shown in FIG. 5 could be a public wide area network (WAN) or it could be a private network, for example a local area network (LAN).

The network addresses of the source and destination nodes are established by network management. These addresses are permanent in the sense that they are established for an indefinite period. The routing tables used in the switching nodes for cells being transmitted in accordance with the connectionless service are established by network management and not by signalling. Consequently, even on the first occasion that a source node transmits ATM cells through the network to a particular destination node, the cells are transmitted without performing a signalling operation.

What is claimed is:

1. A method of transmitting asynchronous transfer mode (ATM) cells from a source node to a destination node over an ATM network between an ATM input interface and an ATM output interface selectively in either a connectionless manner or a connection-oriented manner, said source node and destination node each having a network address, each ATM cell comprising a header and a user section, said network comprising a network of interconnected nodes at least some of which are switching nodes;

in the event of transmitting an ATM cell over the network in a connectionless manner between an ATM input interface and an ATM output interface, in which data cells or packets are received at the ATM input interface according to a protocol other than ATM, each data cell or packet containing a source address and a destination address, said method comprising the steps of:

at the ATM input interface, decomposing each received data cell or packet into ATM cells;

while decomposing each data cell or packet, reading its source and destination addresses;

at the ATM input interface, setting a field in the header of the ATM cell to a value which indicates connectionless transmission and inserting the destination address and the source address which were read during the decomposing step into the header, the source address being the network address of the source node and the destination address being the network address of the destination node;

at each switching node between the ATM input interface and the ATM output interface, establishing the cell is to be forwarded in a connectionless manner by reading said field in the header, reading the destination address in the header, selecting an output port in accordance with at least the destination address and forwarding the cell on the selected output port;

at the ATM output interface, re-assembling the ATM cells into data cells or packets according to the protocol in which the data cells or packets are received at the ATM input interface;

in the event of transmitting an ATM cell over the network in a connection-oriented manner between an ATM input interface and an ATM output interface, said method comprising the steps of:

at the ATM input interface setting the virtual path identifier (VPI) and the virtual channel identifier (VCI) fields in the header; and at each switching node between the ATM input interface and the ATM output interface, establishing the cell is to be forwarded in a connection-oriented manner, reading the VPI and/or VCI fields in the header, selecting an output port in accordance with the VPI and/or VCI values, updating the VPI and/or VCI fields, and forwarding the cell on the selected output port.

2. A method as in claim 1, comprising, in the event of transmitting an ATM cell over the network in a connectionless manner, the following additional steps:

at each switching node between the ATM input interface and the ATM output interface, reading the source address;

at each switching node between the ATM input interface and the ATM output interface, in said step of selecting an output port, selecting an output port in accordance with both the destination address and the source address; and at each switching node between the ATM input interface and the ATM output interface, in said step of forwarding the call on the selected output port, forwarding the cell.

3. A method as in claim 1 comprising, in the event of transmitting an ATM cell over the network in a connectionless manner, the following additional steps:

at the ATM input interface, inserting an indication that a particular type of service is required into the header; and at each switching node between the ATM input interface and the ATM output interface, checking the header for an indication that a particular type of service is required and, where appropriate, performing at least one operation to provide the required type of service.

4. A method as in claim 1 comprising, in the event of transmitting an ATM cell over the network in a connectionless manner, the following additional steps:

at the ATM input interface, inserting an indication in the header that additional processing is required at least one node between the ATM input interface and the ATM output interface;

at each switching node between the ATM input interface and the ATM output interface, checking the header for an indication that additional processing is required; and where appropriate, at least one node between the ATM input interface and the ATM output interface, performing the required additional processing.

5. A method as in claim 1, in which cells are transmitted over the ATM network to provide a multicast service, the cells being transmitted over the network in said connectionless manner;

in said step of inserting a destination address and a source address into the header, the destination address is the network address of the multicast service;

in said step of selecting an output port in accordance with at least the destination address, at least one output port is selected in accordance with at least the destination address; and in said step of forwarding the cell on the selected output port, the cell is forwarded on said at least one output port.

* * * * *